United States Patent
Huang

(10) Patent No.: US 7,778,037 B2
(45) Date of Patent: Aug. 17, 2010

(54) DUAL-INTERFACE DATA STORAGE APPARATUS

(75) Inventor: Hong En Huang, Hsinchu (TW)

(73) Assignee: Phison Electronics Corp., Chutung Hsinchu (TW)

( * ) Notice: Subject to any disclaimer, the term of this patent is extended or adjusted under 35 U.S.C. 154(b) by 251 days.

(21) Appl. No.: 11/905,010

(22) Filed: Sep. 27, 2007

(65) Prior Publication Data
US 2009/0089496 A1    Apr. 2, 2009

(51) Int. Cl.
*H05K 5/00*    (2006.01)
(52) U.S. Cl. ..................... 361/752; 361/737
(58) Field of Classification Search ............. 361/737, 361/752, 790, 730, 797
See application file for complete search history.

(56) References Cited
U.S. PATENT DOCUMENTS

| | | | |
|---|---|---|---|
| 6,663,007 B1 * | 12/2003 | Sun et al. | 235/487 |
| 7,004,780 B1 * | 2/2006 | Wang | 439/353 |
| 7,092,256 B1 * | 8/2006 | Salazar et al. | 361/737 |
| 7,422,454 B1 * | 9/2008 | Tang et al. | 439/131 |
| 2007/0015407 A1 * | 1/2007 | Loftus | 439/607 |

* cited by examiner

Primary Examiner—Hung S Bui
(74) Attorney, Agent, or Firm—Bacon & Thomas, PLLC

(57) ABSTRACT

The present invention discloses a dual interface data storage apparatus, including: a memory module, a first interface and a second interface connected with the memory module, a housing, and a movable carriage for carrying the memory module, the first interface, and the second interface. The housing accommodates the memory module, the first interface and the second interface, and has a first opening at one end and a second opening at the other end for either allowing the first interface or the second interface to pass through the first opening or the second opening.

20 Claims, 8 Drawing Sheets

DUAL-INTERFACE DATA STORAGE APPARATUS

FIELD OF THE INVENTION

The present invention relates to a data storage apparatus with dual interfaces, and more particularly, to a data storage apparatus with two retractable interfaces for use with a host computer.

BACKGROUND OF THE INVENTION

Data acquisition has seen remarkable improvements as technology evolved over the years. Various local peripheral devices are coupled to computer systems via a variety of recently developed interfaces, including USB, mini USB, IEEE-1394, and others. The foregoing interfaces are usually equipped with a high-speed serial bus to revolutionize the transport of digital data for computers and for professional or consumer electronics products. Besides, their plug-and-play feature is capable of searching for and loading an appropriate device driver for the coupled peripheral device, which makes them ideal for connecting devices to computers and contributes to their widespread adoption in industrial applications, including flash drive and thumb drive. Such advantages escalate data portability and mobility, but always accompany shortcomings. In other words, these ubiquitous interfaces are rather delicate and vulnerable to damp or static electricity. Therefore, standard flash drive or pen drive is usually equipped with a cap or cover to protect its interface from the risk of exposure.

FIG. 1 is a perspective view of a conventional pen drive, including a cover 11, a USB 12 interface, and a case 13. The cover 11 is detachably connected to the case 13 to cover the USB interface 12. The case 13 is internally provided with circuits for storing and transmitting computer data, and is electrically connected to the USB interface 12, such that when the cover 11 is removed from the case 13 to expose the USB interface 12, which may be directly plugged into a USB hub provided on a computer to function like an externally connected hard disk drive to transmit or store data. The USB interface 12 is integrally connected to an end of the case 13, and is protected by the cover 11 against unexpected damage from collision, damage, distortion or deformation of the USB interface 12. The cover 11 is completely separated from the case 13 once it is removed therefrom. In the event a user carelessly lost the separated cover 11, the USB interface 12 is no longer protected and stands a great chance of damage. Hence, how to improve the disadvantage in prior art is the major discussion of the present invention.

FIG. 2 is a schematic diagram of a flash drive with a retractable USB interface for eliminating chances of losing the cap for protecting the USB interface. As illustrated in FIG. 2A and FIG. 2B, a USB interface 22 is retractable and primarily controlled by pushing a button 21. When pushing forward the button 21, as the arrow indicated in FIG. 2A, the USB interface 22 protrudes out a case 23 of the flash drive. Reversely, when pushing the button 21 toward the direction as the arrow indicated in FIG. 2B, the USB interface 22 is withdrawn back into the case 23. Besides, the case 23 is provided with a slot 231 for allowing linear movement of the button 21. The slot 231 destroys the integrity of surface of the case 23, which could have been reserved for exquisite appearance design or other purposes.

Please refer to FIG. 3A and FIG. 3B. They illustrate a structure of a data storage apparatus according to U.S. Pat. No. 7,121,852, including a first interface 10, a body 12, and a second interface 14. Each of the top and bottom surfaces of the body 12 is respectively disposed with a containing space 19, and on a top and a bottom end of the body 12 are each respectively pivotally disposed with the first interface 10 and the second interface 14, such that both of the first interface 10 and the second interface 14 can be respectively accommodated into the containing spaces 19. As illustrated in FIG. 3B, the first interface 10 and the second interface 14 are pivotally accommodated in the containing spaces 19 of the body 12, while there are portions of both interfaces left uncovered. The pivotal joint might become loose after constant usage, thus the interfaces would fall off the containing spaces. As a result, the first interface and the second interface still might suffer from the risk of exposure.

Therefore, a need exists for a dual interface data storage apparatus with protection mechanism. A movable carriage and a push button disposed thereon are adopted for controlling movement of the dual interfaces. Through switching the push button, both of the interfaces are able to either protrude out or drawn back into the case of the data storage apparatus. Unlike conventional storage apparatuses, the present invention not only eliminates chances of losing the cap of the conventional storage apparatus, but significantly mitigates the problems of prior arts as well.

SUMMARY OF THE INVENTION

Certain problems of previous devices have been recognized by the present invention. It has been noted that previous apparatus did not take advantage of the benefits which have been found to be possible according to the present invention. It is an object of the present invention to provide a dual interface data storage apparatus with a protection mechanism for its interfaces.

In accordance with an aspect of the present invention, a dual interface data storage apparatus includes a memory module, a first interface and a second interface connected with the memory module, a housing, and a movable carriage for carrying the memory module, the first interface, and the second interface. The housing accommodates the memory module, the first interface and the second interface, and has a first opening at one end and a second opening at the other end for either allowing the first interface or the second interface to pass through the first opening or the second opening.

Certainly, the data storage apparatus further includes at least one controller for integrating and controlling operations of the first interface and the second interface.

Certainly, the data storage apparatus further includes a push button with a flange provided on the movable carriage for controlling movement thereof.

Preferably, the housing is horizontally provided with a first notch, a second notch, and a third notch sequentially for engaging with the flange of the push button and positioning the movable carriage.

Preferably, the first interface protrudes from the first opening when the push button is pushed in one direction and engaged with the first notch, while the second interface protrudes from the second opening when the push button is pushed in the other direction, which is opposite to the one direction, and engaged with the third notch.

Preferably, the first interface and the second interface remain hidden in the housing when the push button is engaged with the second notch.

Preferably, the movable carriage is released from engagement when the push button is depressed downward relative to the housing.

Alternatively, the housing is laterally provided with a first notch, a second notch, and a third notch sequentially for engaging with the flange of the push button and positioning the movable carriage.

Preferably, the first interface protrudes from the first opening when the push button is pushed in one direction and engaged with the first notch, while the second interface protrudes from the second opening when the push button is pushed in the other direction, which is opposite to the one direction, and engaged with the third notch.

Typically, wherein when the push button is engaged with the second notch, the first interface and the second interface remain hidden in the housing.

Alternatively, the movable carriage is released from engagement when the push button is depressed inwardly laterally relative to the housing.

Certainly, the push button is resilient.

Additionally, a groove is provided in the housing for linearly guiding the movable carriage, such that the flange can be longitudinally slidably engaged with the groove.

Alternatively, the memory module is connected with the first interface and the second interface via flat cables, respectively.

Additionally, the housing is provided with a key chain hole.

Alternatively, the first interface and the second interface comprise a USB interface, a mini USB interface, an IEEE-1394 interface, and an eSATA interface.

Additionally, the data storage apparatus further includes a write-protection switch on the housing for protecting data stored in the data storage apparatus from being modified.

Alternatively, the data storage apparatus comprises a USB PenDrive and a USB flash drive.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENTS

The present invention discloses a dual interface data storage apparatus with protection mechanism for its dual interfaces. The objects and advantages of the present invention will become more readily apparent to those ordinarily skilled in the art after reviewing the following detailed description. The present invention needs not be limited to the following embodiments.

Figure 1:
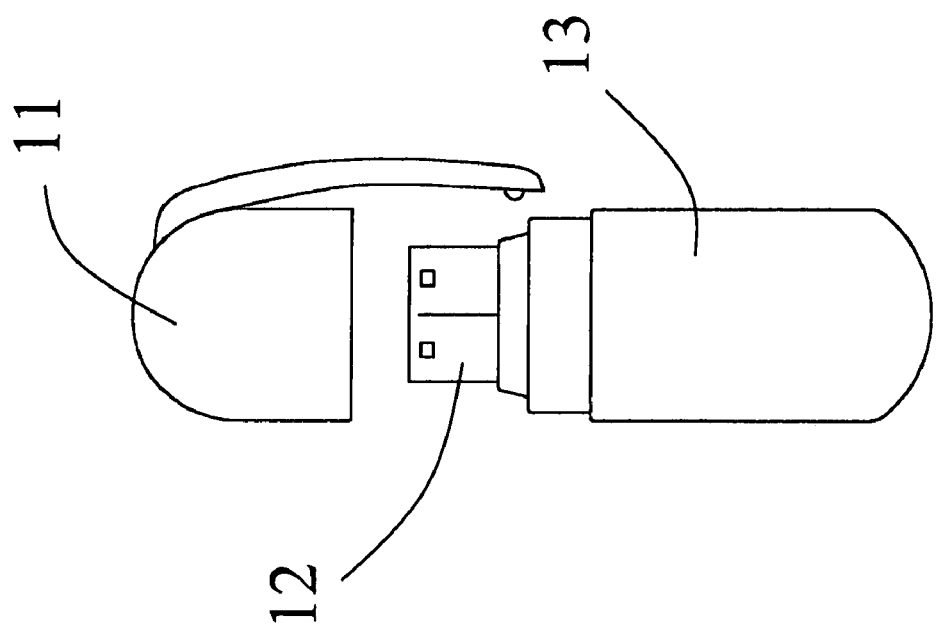
FIG. 1 is a schematic diagram of a standard flash drive with a USB interface according to the prior art.
Figure 2B:
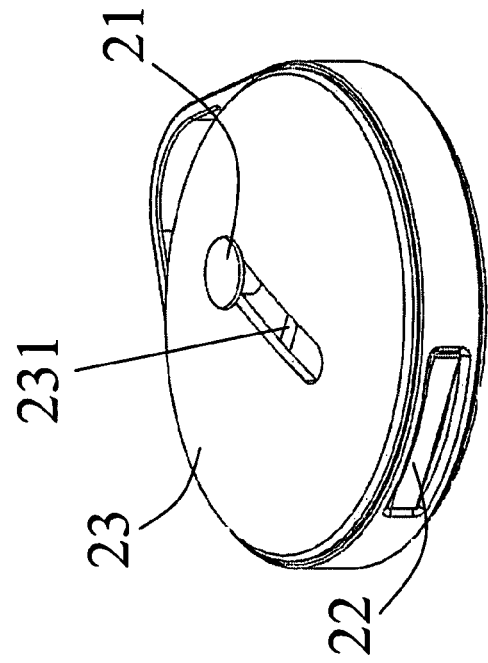
FIGS. 2A-2B are schematic diagrams of a flash drive with a retractable USB interface according to the prior art.
Figure 2A:
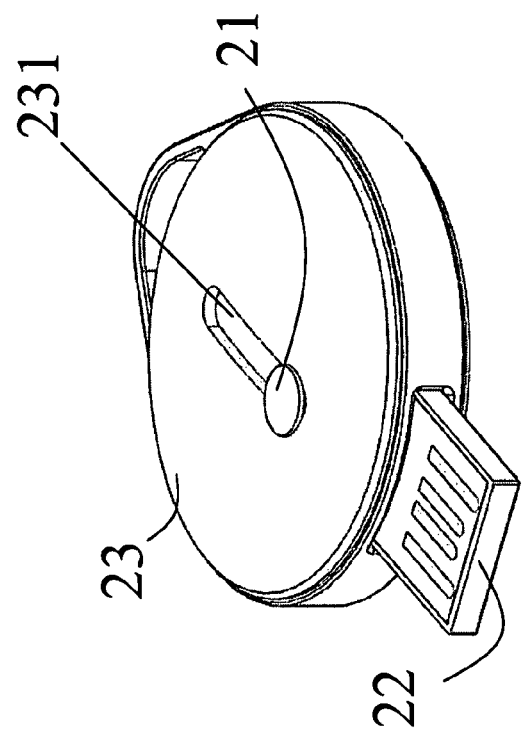
Figure 3A:
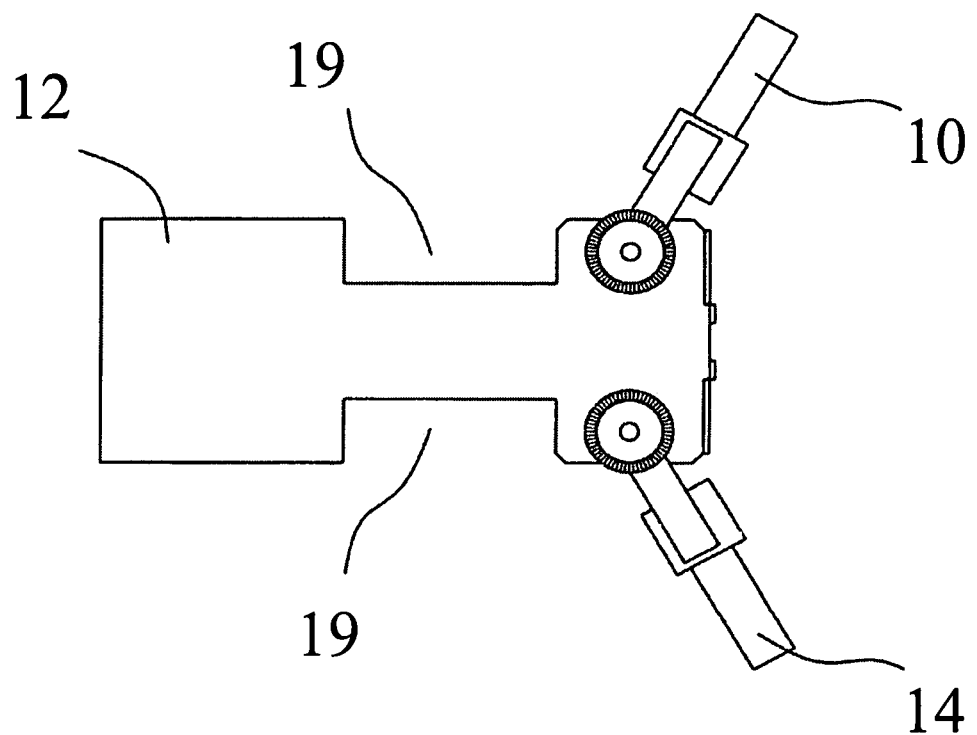
FIGS. 3A-3B are schematic diagrams of a data storage apparatus according to the prior art.
Figure 3B:
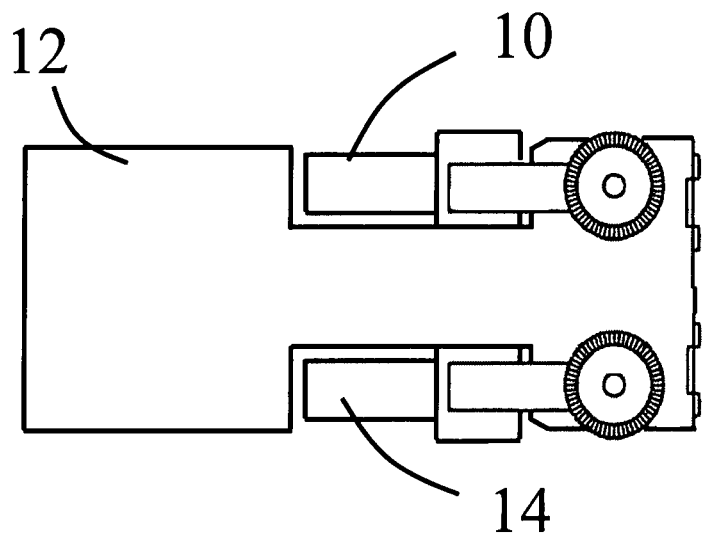
Figure 4A:
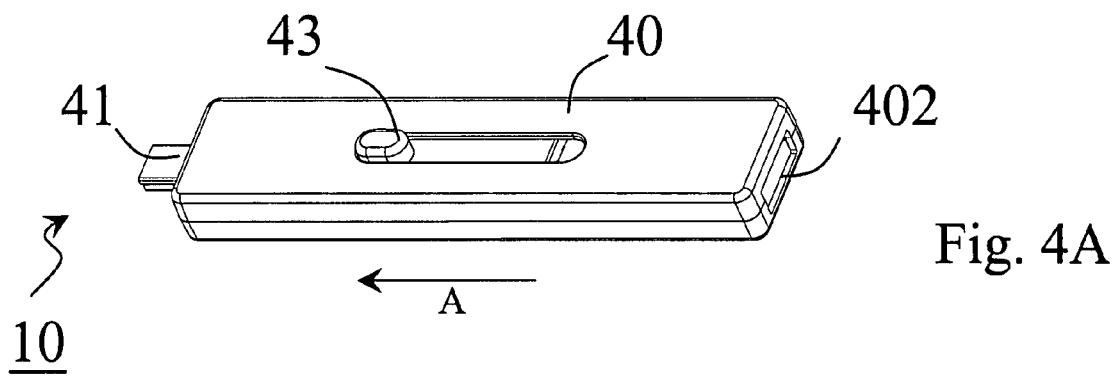
FIGS. 4A-4C illustrate a first embodiment of a data storage apparatus according to the present invention.
Figure 4B:
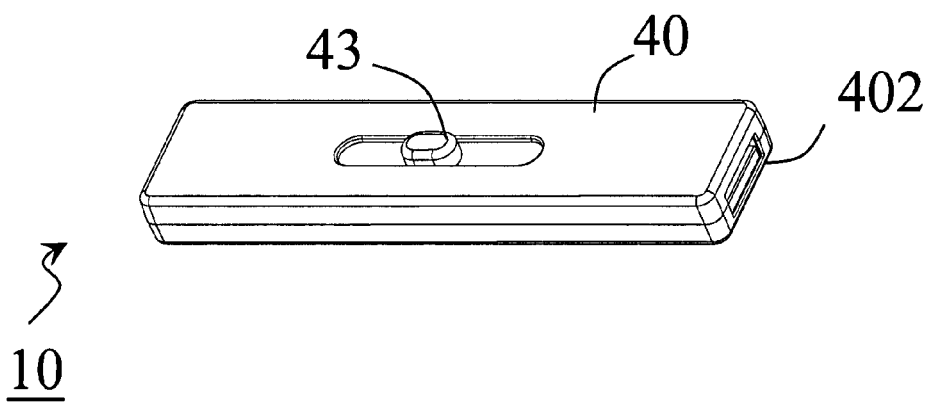
Figure 4C:
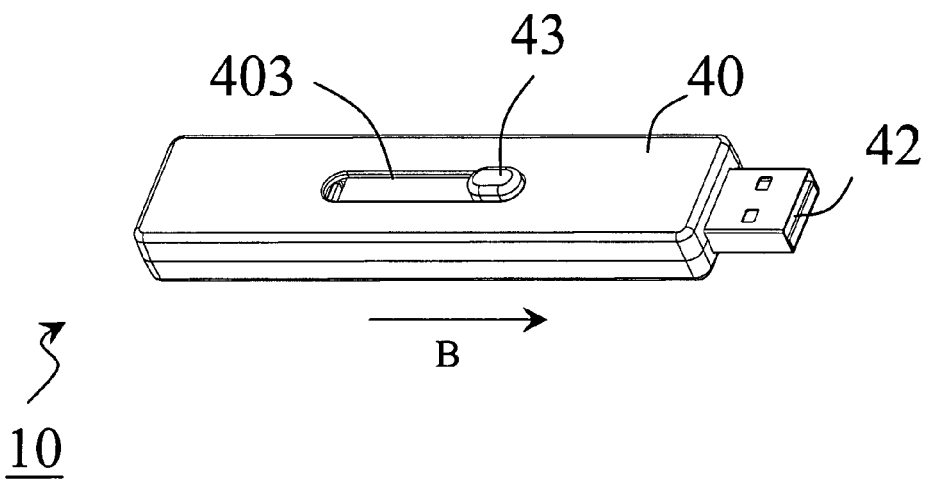
Figure 6A:
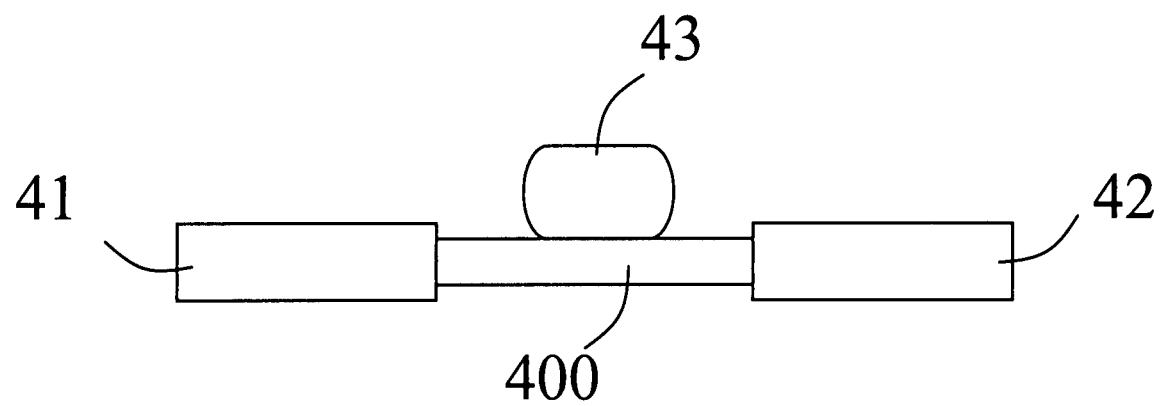
FIGS. 6A-6B illustrate interior architectures of the data storage apparatus according to the present invention.

FIGS. 4A to 4C illustrate a first embodiment of a data storage apparatus according to the present invention. The data storage apparatus 10 includes a housing 40, a movable carriage 400 as shown in FIG. 6A for carrying a memory module (not shown), a first interface 41 at one end and a second interface 42 at the other end. The memory module having a built-in controller for performing various operations, including writing and erasing, can be a NAND flash memory. A push button 43 moved inside a slit 403 is devised to control movement of the movable carriage 400. Operations of the first interface 41 and the second interface 42 are controlled and integrated by at least one controller IC (not shown) mounted on the movable carriage 400. The first interface 41 is a mini USB interface, while the second interface 42 is a USB interface. In alternative execution of embodiments, the first and the second interface can be an IEEE-1394 interface, an eSATA interface, or other interfaces to be developed, respectively. For better applications of the present invention, the first interface 41 and the second interface 42 can be different from each other, and is likely of various types of connectors, either female connectors or male connectors, for the foregoing interfaces, such as an IEEE-1394 interface or an eSATA interface. The housing 40 has a sufficient capacity for accommodating the movable carriage 400, and is provided with a first opening (not shown) and a second opening 402 (opposite to the first opening) for either allowing the first interface 41 and the second interface 42 to exit through.

Under influence of the force generated by thrusting the push button 43 toward one direction signified by the arrow A in FIG. 4A, the movable carriage 400 is moved and thus the first interface 41 mounted thereon sticks out through the opening. On the other hand, the second interface 42 sticks out through the second opening 402 if the push button 43 is thrust toward the other direction opposite to the one direction, as signified by the arrow B in FIG. 4C. Otherwise, both of the first interface 41 and the second interface 42 remain hidden and protected in the housing 40 when the push button 43 is positioned in the middle of the slit 403, as shown in FIG. 4B. The movement of the movable carriage 400 controlled by the push button 43 would be expatiated in the follow-up descriptions.

Figure 5A:
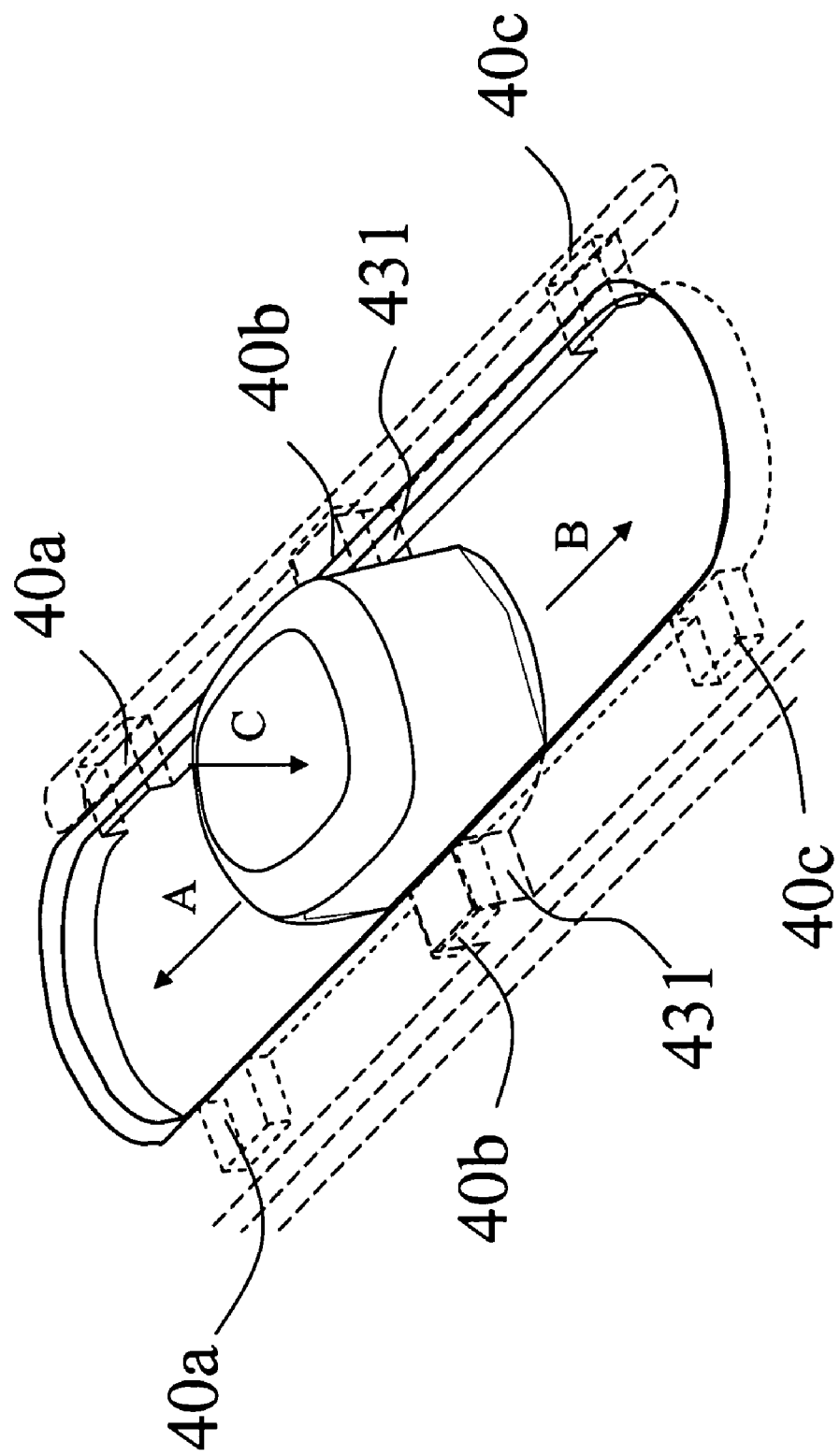
FIGS. 5A-5C illustrate movement of a push button of the data storage apparatus according to the present invention.
Figure 5C:
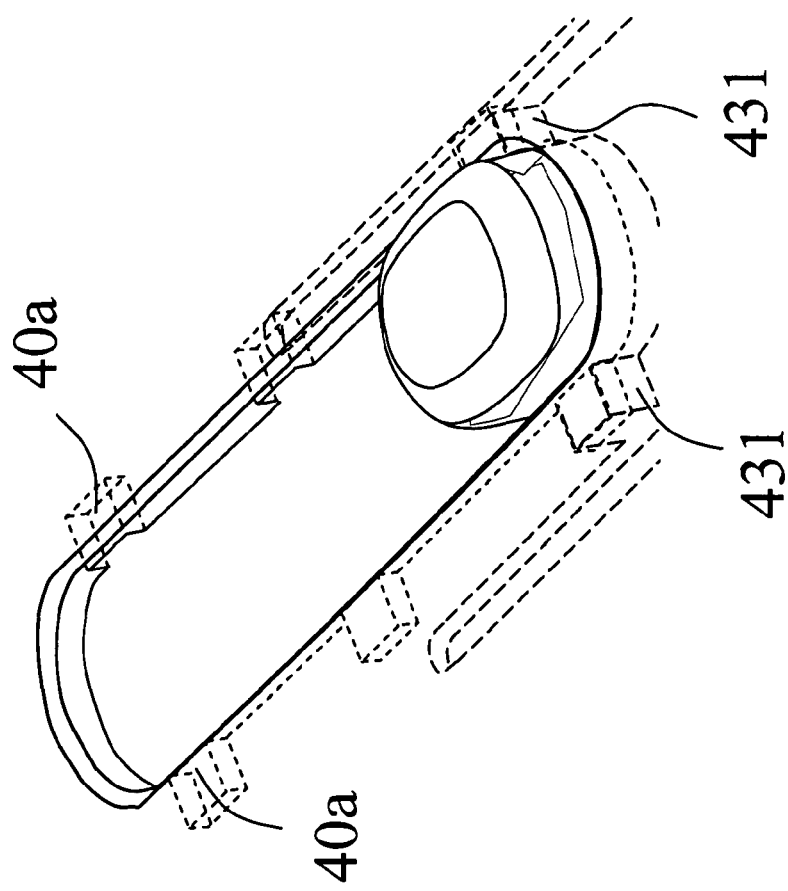
Figure 5B:
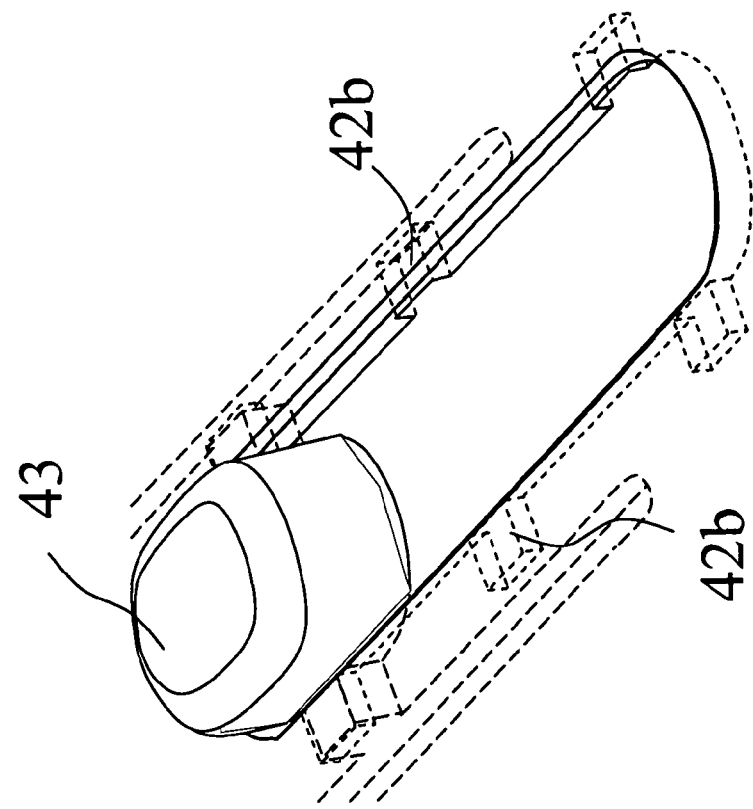

FIGS. 5A to 5C are schematic diagrams illustrating movement of the movable carriage 400. The above-mentioned interfaces usually withstand tremendous forces between plugging into and pulling from ports of the host computer. For positioning the first and the second interfaces during usage with the host computer, first notches 40a, second notches 40b, and third notches 40c are sequentially provided on the housing 40 for engaging with flanges 431 of the push button 43. Please refer to FIG. 5A, where the push button 43 is positioned in the middle of the slit 403, the flanges 431 engage with the second notches 40b, and the first interface 41 and the second interface 42 remain hidden without protruding out of the housing 40, as shown in FIG. 4B. The push button 43 is desirably resilient. Before moving the push button 43 toward the directions as the arrow A and arrow B indicated in FIG. 5A, the push button 43 must be depressed downward (as arrow C indicated) to release engagement between the flanges 431 and the second notches 40b.

Refer now to FIG. 5B. When the push button 43 is depressed and pushed in the direction the arrow A indicates, the movable carriage 400 along with the first interface 41 and the second interface 42 mounted thereon is moved accordingly. Sequentially, the flanges 431 of the push button 43 clip with the first notches 40a, and the first interface 41, i.e. the mini USB interface, protrudes out through the first opening while the second interface 42 remains hidden and covered in housing 40, as shown in FIG. 4A. Conversely, the second interface 42, i.e. the USB interface, sticks out of the second opening 402 and the first interface 41 becomes hidden in the housing 40 when the push button 43 is forced in the direction indicated by the arrow B, and the flanges 431 clip with the third notches 40c. The flanges 431 are longitudinally slidably engaged with a groove (not shown) provided in the housing 40 for linearly guiding the movable carriage 400. Alternatively, the housing 40 can be further provided with a hole (not shown) defined for receiving key chains or strips therein as transportation aids. For better results, the housing 40 can be further equipped with a write-protection switch (not shown) to keep the host computer from writing or modifying data on the data storage apparatus 10.

Figure 6B:
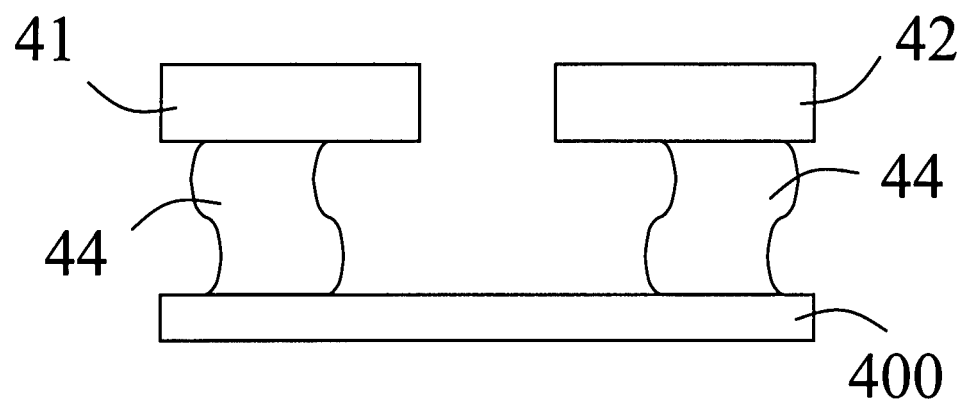

FIGS. 6A and 6B illustrate interior architectures of the data storage apparatus according to the present invention. FIG. 6A schematically shows the interior architecture of the data storage apparatus 10 in accordance with the present invention. The first interface 41 is mounted on one end of the movable carriage 400, while the second interface 42 is mounted on the other end of the movable carriage 400, respectively. Please refer to FIG. 6B. The first interface 41 and the second interface 42 are connected to the movable carriage 400 on Flexible Flat Cable (FFC) or Flexible Printed Circuit (FPC) 44, respectively. The interior architecture illustrated in FIG. 6B reduces overall length of the data storage apparatus 10 in FIG. 4 and contributes to a more compact size.

Figure 7A:
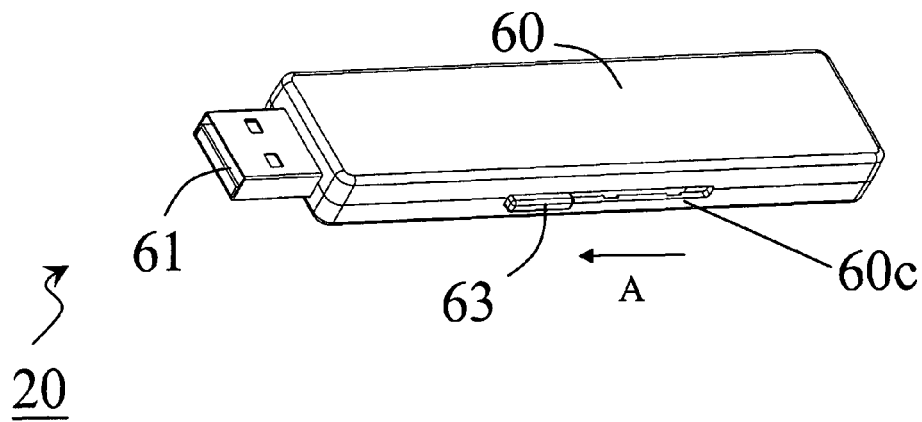
FIGS. 7A-7C illustrate a second embodiment of the data storage apparatus according to the present invention.
Figure 7B:
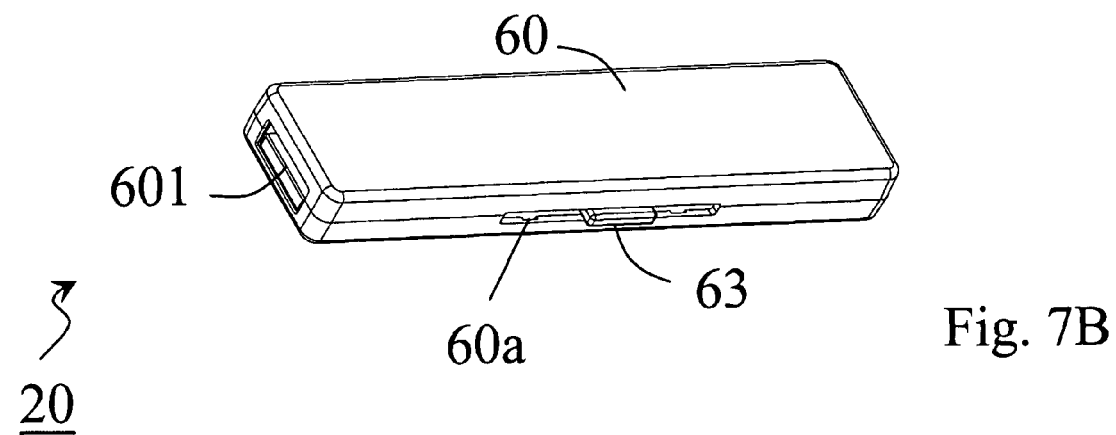
Figure 7C:
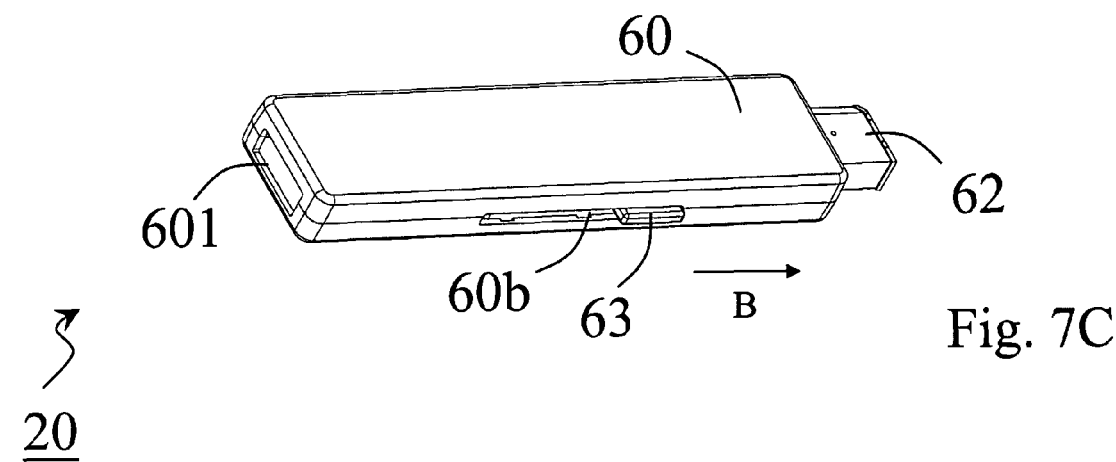

Please refer to FIGS. 7A to 7C. They show a second embodiment of a data storage apparatus according to the present invention. Likewise, the data storage apparatus 20 includes a housing 60, a movable carriage (not shown) for carrying a memory module (not shown), a first interface 61 at one end and a second interface 62 at the other end. Movement of the movable carriage is controlled by a push button 63. Besides, at least one controller IC (not shown) is employed for integrating and controlling operations of the first interface 61 and the second interface 62. The first interface 61 is a USB interface, while the second interface 62 is an IEEE-1394 interface. The first and the second interfaces can be other interfaces, such as an eSATA interface and a mini USB interface, respectively. The housing 60 is provided with a first opening 601 and a second opening (now shown) opposite to the first opening 601 allowing the first interface 61 and the second interface 62 to exit through, one at a time.

The primary difference between the first embodiment and the second embodiment lies in the disposition of the push button. As shown in FIG. 4A, the push button 43 apparently moves within the slit 403 provided on a top cover of the housing 40. In this embodiment, the push button 63 is laterally provided on the housing 60. Therefore, the push button 63 must be depressed inwardly relative to the housing to release its engagement with a plurality of notches provided on the housing 60, including the first notches 60a, the second notches 60b, and the third notches, 60c.

The controlling movement of the push button 63 is similar to that described in the first embodiment. The first interface 61 sticks out through the first opening 601 when the push button 63 is forced in the direction indicated by the arrow A in FIG. 7A and engages with the first notches 60a. Otherwise, the second interface 62 sticks out through the second opening and the first interface 61 is withdrawn back into the housing 60 when the push button 63 is switched to clip with the third notches 60c as the arrow B in FIG. 7C illustrated. When the push button is engaged with the second notches 60b, both of the first interface 61 and the second interface 62 are hidden in the housing 60, as shown in FIG. 7B. Alternatively, the housing 60 can be further provided with a hole confined for connection to a keychain or a strip for transportation purpose. Differentiated from the data storage apparatus 10 in FIG. 4, this embodiment keeps top and bottom surfaces of the housing 60 intact. Such intact surfaces can be reserved for personalization and elaboration on the housing 60. For example, exquisitely-designed logo can be tagged on the intact surfaces of the housing on the manufacturer's site to avoid malicious reproduction.

In conclusion, the present invention discloses a data storage apparatus not only equipped with dual interfaces, but also have protection mechanism for its interfaces. A push button is introduced for controlling movement of the dual interfaces of the data storage apparatus. According to the present invention, one interface is a USB interface, and the other interface can be an IEEE-1394 interface. Simply switching the push button to a first predefined position, the USB interface would protrudes out of the housing of the data storage apparatus, and is in the state to be coupled with a USB port on a host computer. If the push button is switched to a second predefined position, the IEEE-1394 interface would protrudes out, while the USB interface is withdrawn into the housing subsequently. Otherwise, both of the USB and the IEEE-1394 interfaces are covered by the housing when the push button is switched to the middle of the first and the second predefined positions. Such a user-friendly design eliminates chances of losing the protection cap of conventional two-piece flash drive, and is of extensive applications in flash drive, thumb drive, or pen drive. This convenient invention makes users no longer carry various data storage apparatuses. The present invention substantively escalates portability and mobility of data storage apparatus, and eliminates the prior potential deficiencies.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A data storage apparatus, comprising:
 a memory module;
 a first interface and a second interface connected with the memory module for enabling the memory module to communicate with an external host device;
 a housing for accommodating the memory module, the first interface and the second interface, having a first opening at one end for the first interface to pass through and a second opening at the other end for the second interface to pass through; and
 a movable carriage provided in the housing for carrying the memory module, the first interface, and the second interface, thereby allowing the first and second interfaces to either protrude out of or draw back into the housing of the data storage apparatus.

2. The data storage apparatus according to claim 1, further comprising at least one controller for integrating and controlling operations of the first interface and the second interface.

3. The data storage apparatus according to claim 1, further comprising a push button with a flange provided on the movable carriage for controlling movement thereof.

4. The data storage apparatus according to claim 3, wherein the housing is horizontally provided with a first notch, a second notch, and a third notch sequentially for engaging with the flange of the push button and positioning the movable carriage.

5. The data storage apparatus according to claim 4, wherein the first interface protrudes from the first opening when the push button is pushed in one direction and engaged with the first notch, while the second interface protrudes from the second opening when the push button is pushed in the other direction, which is opposite to the one direction, and engaged with the third notch.

6. The data storage apparatus according to claim 4, wherein the first interface and the second interface remain hidden in the housing when the push button is engaged with the second notch.

7. The data storage apparatus according to claim 5, wherein the movable carriage is released from engagement when the push button is depressed downward relative to the housing.

8. The data storage apparatus according to claim 3, wherein the housing is laterally provided with a first notch, a second notch, and a third notch sequentially for engaging with the flange of the push button and positioning the mobile carriage.

9. The data storage apparatus according to claim 8, wherein the first interface protrudes from the first opening when the push button is pushed in one direction and engaged with the first notch, while the second interface protrudes from the second opening when the push button is pushed in the other direction, which is opposite to the one direction, and engaged with the third notch.

10. The data storage apparatus according to claim 8, wherein when the push button is engaged with the second notch, the first interface and the second interface remain hidden in the housing.

11. The data storage apparatus according to claim 9, wherein the movable carriage is released from engagement when the push button is depressed inwardly laterally relative to the housing.

12. The data storage apparatus according to claim 3, wherein the push button is resilient.

13. The data storage apparatus according to claim 3, wherein a groove is provided in the housing for linearly guiding the movable carriage, such that the flange can be longitudinally slidably engaged with the groove.

14. The data storage apparatus according to claim 1, wherein the memory module is connected with the first interface and the second interface via Flexible Flat Cable (FFC) or Flexible Printed Circuit (FPC), respectively.

15. The data storage apparatus according to claim 1, wherein the housing is provided with a key chain hole.

16. The data storage apparatus according to claim 1, wherein the first interface and the second interface comprise a USB interface, a mini USB interface, an IEEE-1394 interface, and an eSATA interface.

17. The data storage apparatus according to claim 1, further comprising a write-protection switch on the housing for protecting data stored in the data storage apparatus from being modified.

18. The data storage apparatus according to claim 1, wherein the data storage apparatus comprises a USB Pen-Drive and a USB flash drive.

19. The data storage apparatus according to claim 1, wherein the first interface is different from the second interface.

20. A data storage apparatus, comprising:
a memory module having at least one controller and at least one NAND flash memory;
a USB interface and a non-USB interface connected with the memory module for enabling the memory module to communicate with an external host device;
a housing for accommodating the memory module, the USB interface and the non-USB interface, having a first opening at one end for the USB interface to pass through and a second opening at the other end for the non-USB interface to pass through; and
a movable carriage provided in the housing for carrying the memory module, the USB interface, and the non-USB interface, thereby allowing the USB and non-USB interfaces to either protrude out of or draw back into the housing of the data storage apparatus.

* * * * *